July 21, 1953  W. F. FUCHS ET AL  2,645,959
WIRE STRIPPING AND TWISTING DEVICE
Filed Oct. 6, 1950

INVENTORS:
W. F. FUCHS
V. LEKAN
BY
ATTORNEY

Patented July 21, 1953

2,645,959

UNITED STATES PATENT OFFICE 2,645,959

WIRE STRIPPING AND TWISTING DEVICE

William F. Fuchs, Berwyn, and Vincent Lekan, Chicago, Ill., assignors to Western Electric Company, Incorporated, New York, N. Y., a corporation of New York Application October 6, 1950, Serial No. 188,848

4 Claims. (Cl. 81—9.51)

This invention relates to a wire stripping and twisting device and more particularly to a rotary device for stripping predetermined portions of the sleeve of insulation from the ends of stranded wire conductors and twisting the strands about themselves.

In the manufacture of certain types of electrical apparatus, as for example, some types of telephone equipment, it is desirable to use stranded wire conductors rather than solid wire conductors, and in connecting the conductors to the terminals of the equipment it is necessary that the sleeve of insulation be removed from a predetermined portion of the ends of the conductors, and that the conductor strands be twisted about themselves to form a straight and relatively rigid end to facilitate their connection to the equipment.

It is an object of the present invention to provide a simple and effective device for stripping an end portion of the sleeve of insulation from a stranded wire conductor and twisting the bared end portions of the stranded wire about themselves.

In accordance with one embodiment of the invention there is provided a motor driven member for supporting for rotation therewith and for radial movement relative thereto a pair of cutting blades having inwardly directed cutting edges, and cam means for actuating the cutting blades inwardly under control of the operator to sever a portion of the sleeve of insulation of a stranded conductor cord positioned between the cutting blades on the axis of rotation of the rotatable member, and to remove the severed portion of the sleeve as the conductor is removed axially from the device. A pair of twisting members or blocks are slidably mounted on the blades for rotation therewith and for radial movement relative thereto, and are resiliently urged radially inwardly in advance of the cutting edges of the blades to engage a conductor cord and the bare stranded wire as the conductor cord being stripped is removed axially from the stripping device to twist the strands about themselves.

Other objects and advantages of the invention will become apparent by reference to the following detailed description when considered in conjunction with the accompanying drawings illustrating one embodiment of the invention, in which Fig. 1 is a vertical sectional view of the wire stripping and twisting device with portions broken away and showing an insulation covered stranded wire conductor in position therein;

Figure 5:
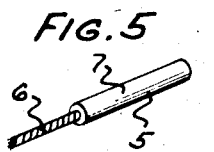

The present device is designed to operate on electrical conductors 5, Fig. 5 having a stranded wire core 6 enclosed within an insulating sleeve 7 and functions to sever the sleeve of insulation at a predetermined distance from the end thereof and strip the severed insulation from the conductor and twist the bare end of the strands about themselves. The stripping and twisting device comprises a rotatable supporting member or yoke 10 fixed to a motor shaft 12 of a motor 13 which in turn is mounted on a suitable base or support 14. The supporting member 10 comprises a cylindrical bearing portion 16 from one end of which radiates a pair of arms 17 on the outer ends of which are formed a pair of axially extending diametrically opposed apertured guide members 18 spaced equidistant from the axis of rotation 20 of the rotatable support 10 and shaft 12. Extending diametrically across the axis of the device from the forward end of the apertured guide member 18 is a guide member 22 recessed to form a guideway 23 for receiving therein a pair of cutters, cutting members or blades 25 therein. A slotted cover plate 26 secured to the member 22 by screws 27 cooperates therewith to form a guideway for guiding the cutters 25 for radial movement.

Figure 1:
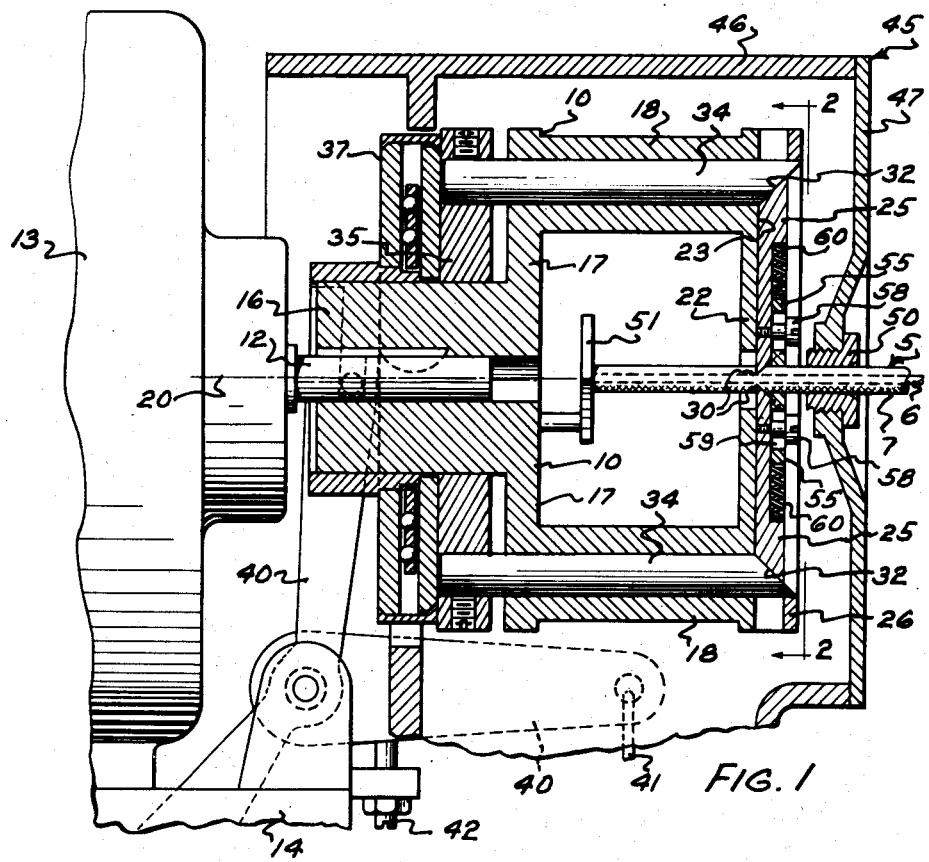
Figures 2, 3:
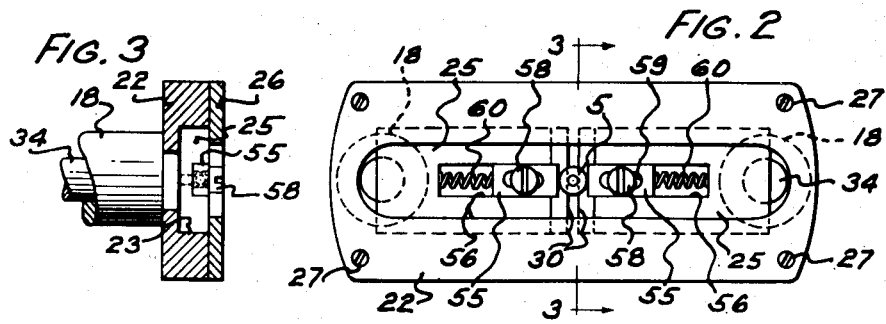
Fig. 2 is a front elevational view of a portion of the device indicated by the line 2—2 of Fig. 1 and rotated 90° relative to the position thereof shown in Fig. 1.
Fig. 3 is a fragmentary transverse sectional view taken on the line 3—3 of Fig. 2.
Figure 4:
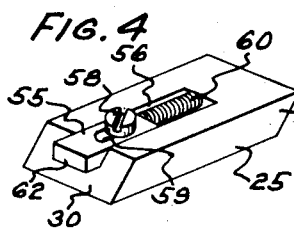
Fig. 4 is a detailed view in perspective of one of the cutting blades and the twisting members mounted thereon and, Fig. 5 is a view of a stranded wire conductor showing a portion of the insulation stripped from the end thereof and the bare strands twisted about themselves.

The cutters 25 are rectangular in cross-section as seen in Fig. 3 and are provided with inclined inner surfaces forming cutting edges 30 at their inner ends, and at their outer ends are formed inclined or cam surfaces 32. Cooperating cam surfaces for camming the cutting blades 25 inwardly are formed on the forward ends of cam members or rods 34 mounted for axial reciprocation in the apertured guides 18 and secured at their rear ends to an apertured disc 35. As the supporting yoke 10 rotates, centrifugal force tends to move the cutting blades 25 radially outwardly, which movement cams the members 34 and the disc 35 rearwardly to a normal retracted position. Any suitable means may be provided for advancing the plate 35 and the cam members 34 to cam the cutting blades 25 inwardly toward each other. As shown herein, the mechanism includes a thrust member 37 in the form of an antifriction bearing race mounted for axial movement, and a bell crank lever 40 pivotally mounted on the base 14 and manually actuatable by any suitable means, as for example, a foot treadle (not shown), through an element 41.

An adjustable stop 42 is provided for limiting the movement of the bell crank 40 and the inward movement of the cutters 25. A removable cover or guide member 45 comprising a cylindrical wall 46 and a front wall 47 encloses a substantial portion of the rotatable portion of the device and has an apertured guide bushing 50 mounted in the front wall thereof in coaxial alignment with the axis 20 for positioning a conductor 5 on the axis 20 and between the cutting edges 30 of the cutters 25. A stop member 51, axially adjustably secured to the rotatable support 10, engages the end of the conductor 5 for stopping the conductor in a predetermined position relative to the cutting edges 30 of the cutters 25.

From the description thus far, it will be seen that with the motor rotating and a conductor supported in the guide bushing 50 with the end thereof engaging the stop 51, that upon actuation of the bell crank lever 40, the cutting blades 25 are moved radially inwardly to a predetermined position causing the cutting edges thereof to sever the insulating sleeve 7 on the conductor so that upon the axial withdrawal of the conductor after the sleeve has been severed, the severed portion of the sleeve will be stripped from the stranded core 6 and will drop into a discharge chute in the lower portion of the device. The portion of the machine thus far described is not new, and commercial structures similar thereto are obtainable.

The mechanism for twisting the bared portion of the stranded wire as the conductor is drawn from the stripping and twisting device comprises a pair of twisting members 55 in the form of rectangular blocks mounted on the cutters 25. The twisting members 55 are slidably mounted in recesses 56 forming guideways in the cutters 25 for guiding the twisting members for radial movement. Shouldered screws 58 fastened to the cutting blades 25 and having portions thereof fitting into slots 59 in the block 55 serve to retain the members 55 on the cutting blades 25 and limit the radial movement of the blocks relative to the cutters. Compression springs 60 engaging the ends of the blocks 55 stress them for movement radially inwardly, and these parts are so arranged that the inner flat face 62 of the blocks are normally positioned in advance of the cutting edges 30 of the blades 25 to engage either the insulating sleeve 7 of the conductor 5 or the stranded wire core 6 thereof during the stripping and twisting operation.

In the operation of the device, while the head 10 is rotating, as the lever 40 is actuated to cause the movement inwardly of the cutting blades 25, the twisting members 55 are moved radially inwardly therewith into engagement with the insulating sleeve 7 of the conductor 5 supported in operative position in the guide bushing 50 and are arrested thereby as the cutting blades continue their movement inwardly to a predetermined position to sever the sleeve 7 of insulation, after which the conductor 5 may be axially withdrawn causing the severed portion of the sleeve to be stripped from the stranded core, and as the conductor 5 is being withdrawn, the flat ends 62 of the twisting members 55 which are stressed toward each other will ride off of the sleeve of insulation 7 into frictional engagement with opposite sides of the bared stranded wires 6 and twist the strands about themselves as the strands 6 are withdrawn axially from between the twisting members. The degree of twisting of the strands about themselves may be varied by varying the rate at which the wire is axially withdrawn from the guide bushing 50.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. In a device of the character described comprising a supporting member rotatable about a predetermined axis and having radially directed guideways for slidably supporting a pair of cutting blades for radial movement toward and away from said axis for severing and stripping a portion of insulation from a conductor, the combination therewith of a pair of members mounted on said cutting blades for rotation therewith and for movement relative thereto radially of said axis, resilient means urging said members radially inwardly toward said axis, and means for limiting the movement of said members on said cutting blades to and from positions in advance of and in the rear of the cutting edges of said blades, said members having opposed surfaces engageable with the outer portions of a conductor positioned on said axis between said cutting blades and for engaging the bared wire as the conductor is withdrawn axially from between said cutting blades.

2. In a wire stripping mechanism having cutters mounted on opposite sides of and for rotation about a predetermined axis and for movement toward and away from a stranded wire conductor cord positioned between said cutters and along said axis for severing and stripping a portion of the insulating sleeve from said cord, the combination with said cutters of a strand twisting device comprising twisting elements, means mounting said elements on said cutters for rotation therewith and for limited movement relative thereto toward and away from a forward position in advance of said cutters, and means actuating said twisting elements towards said forward position on said cutters whereby said elements are caused to engage and twist the strands of a conductor cord as the cord is being stripped and withdrawn from said stripping mechanism.

3. In a wire stripping device having means for supporting a stranded wire conductor along a predetermined axis and having cutting means rotatable about said axis for severing and stripping a portion of the jacket of insulation from said stranded wire cord, the combination therewith of a pair of twisting elements, means mounting said twisting elements on said stripping device on opposite sides of said axis for rotation with said cutting means and for movement toward and away from said axis, said twisting elements being engageable with the cord being stripped at a point adjacent the portion being stripped, means including a yieldable element for moving said twisting elements toward said axis whereby said twisting members are caused to yieldably engage and twist the strands of said conductor cord when the conductor cord being stripped is withdrawn from said stripping device, and means interconnecting the cutting means and the twisting elements for moving the twisting elements away from said axis in response to a predetermined movement of said cutting means.

4. In a wire stripping device having cutters disposed on opposite sides of and rotatable about a predetermined axis and movable toward and away from a stranded wire conductor cord disposed between said cutters on said axis for cutting and stripping a portion of the jacket of insulation from said stranded wire cord, the combination therewith of twisting members, means mounting said twisting members on opposite sides of said axis for rotation with said cutters and for movement toward and away from said axis, said twisting members being engageable with a cord being stripped at a point adjacent the portion being stripped, and means including a resilient element interconnecting the twisting members and the cutters for permitting relative movement therebetween and moving the twisting members into and out of engagement with said conductor cord in response to movement of said cutters into and out of engagement with said cord whereby said twisting members are caused to yieldably engage and twist the strands of said conductor cord when said conductor cord being stripped is withdrawn from said stripping device.

WILLIAM F. FUCHS.
VINCENT LEKAN.

References Cited in the file of this patent

UNITED STATES PATENTS

| Number | Name | Date |
|---|---|---|
| 1,433,320 | Wersel | Oct. 24, 1922 |
| 1,722,087 | Hartman | July 23, 1929 |
| 2,239,755 | Montgomery | Apr. 29, 1941 |